UNITED STATES PATENT OFFICE.

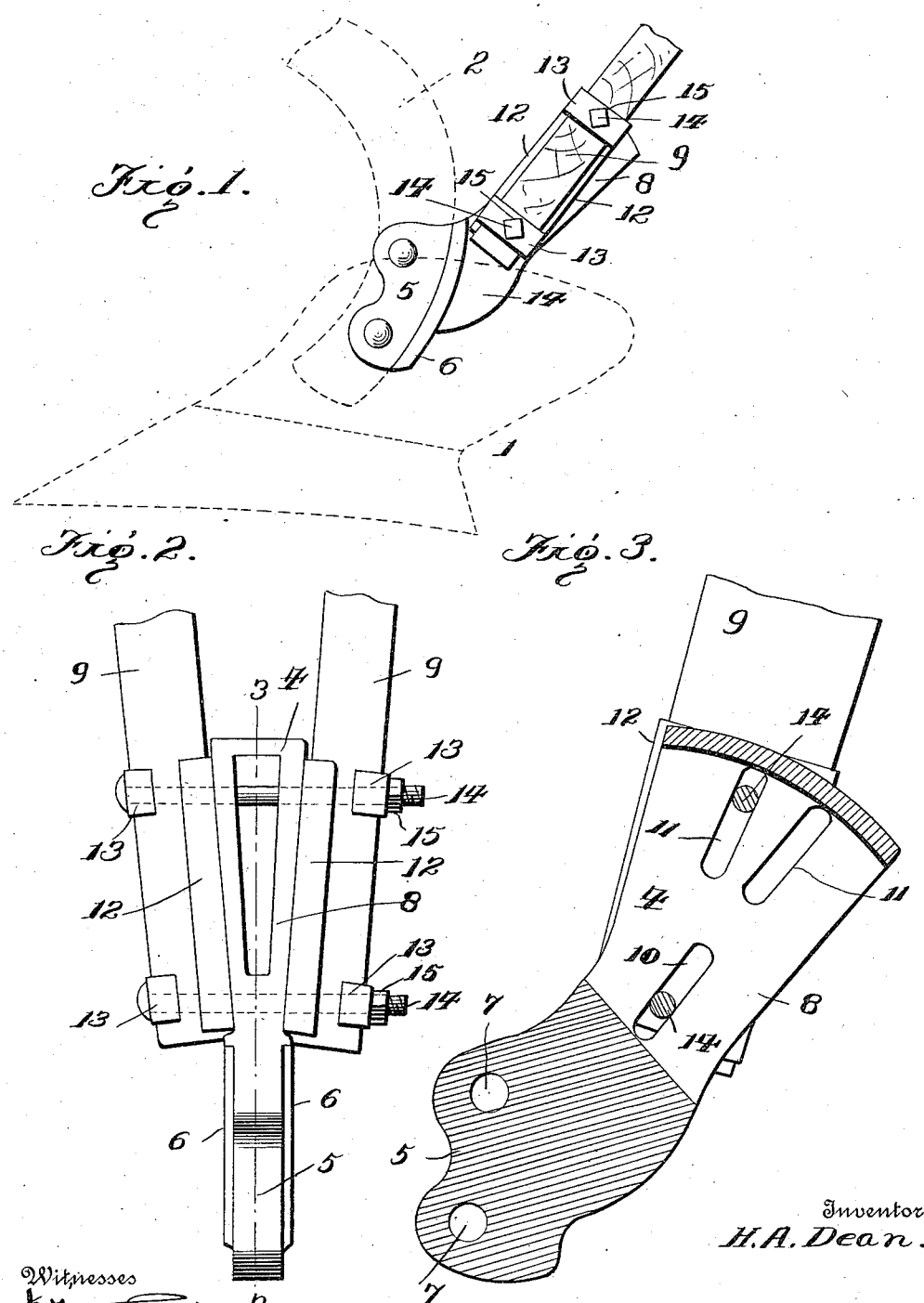

HENRY A. DEAN, OF ROME, GEORGIA, ASSIGNOR OF ONE-FOURTH TO J. B. SULLIVAN, OF ROME, GEORGIA, AND ONE-FOURTH TO W. D. PADEN AND ONE-FOURTH TO W. A. PARKER, OF ATLANTA, GEORGIA.

HANDLE-MOUNT FOR PLOWS.

1,059,844.  Specification of Letters Patent.  Patented Apr. 22, 1913.

Application filed July 23, 1912. Serial No. 711,126.

*To all whom it may concern:*

Be it known that I, HENRY A. DEAN, citizen of the United States, residing at Rome, in the county of Floyd and State of Georgia, have invented certain new and useful Improvements in Handle-Mounts for Plows, of which the following is a specification.

My invention is a handle mount for plows, and has for its object the provision of a simple and efficient device by the use of which the plow handles may be securely attached to the plow standards and may be raised or lowered and set backward or forward to meet various conditions.

The invention also has for its object the provision of a simple and efficient device whereby the handles will be secured in their proper diverging relation and will be effectually braced at the point of attachment to the plow.

The invention is fully illustrated in the accompanying drawings and will be hereinafter described and particularly pointed out in the claims following the description.

In the drawings:—Figure 1 is a side elevation showing a portion of the handles and the mount in full lines and indicating a plow and plow standard in dotted lines; Fig. 2 is a plan view of the ends of the handles and the handle mount secured thereto; Fig. 3 is a longitudinal section on the line 3—3 of Fig. 2.

The plow, 1, may be of any desired construction and the standard, 2, is preferably composed of curved parallel plates secured in spaced relation. The handle mount comprises a casting 4 having one end, 5, adapted to fit between the sides of the standard and provided with ribs 6 on its sides which are curved to conform to and fit snugly against the rear edges of the standard. Perforations 7 are formed in the end of the casing to receive securing bolts which pass through the standard to secure the casing thereto. The rear or outer portion of the casing consists of an upwardly extending body or arm 8 which is preferably hollow so as to avoid unnecessary weight, and the sides of this arm or body diverge upwardly and rearwardly, as clearly shown in Fig. 2, so that the handles 9, when secured against the said sides, will be held in their proper diverging relation. This upwardly and rearwardly extending arm or body 8 is constructed with a central longitudinal lower slot 10 and with two or more upper diverging slots 11, as shown clearly in Fig. 3, through which securing bolts are passed to secure the device between the handles. Wear plates 12 are fitted to the inner faces of the handles and are provided with outwardly projecting flanges adapted to engage the upper and lower edges of the handles whereby the handles will be protected against splitting or other injury when the securing nuts are turned home. Clips 13 are fitted against the outer faces of the handles and the securing bolts 14 are inserted through the handles and the said clips and wear plates, the lower bolt passing through the lower slot 10, while the upper bolt passes through one of the upper slots 11. Securing nuts 15 are mounted upon the outer threaded ends of the bolts and are adapted to be turned home against the adjacent clips 13 to secure the several parts firmly together.

It will be readily seen from the foregoing description, taken in connection with the accompanying drawings, that I have provided an exceedingly simple device by which the handles will be attached to the plow and by which any desired adjustment of the handles may be quickly accomplished. Should it be desired to have the handles set high, the upper securing bolt 14 is passed through the upper slot 11, which is the position illustrated in the drawings, but, if a lower position of the handles is desired, the said bolt will be passed through the lower slot 11, as will be readily understood. The handles may be adjusted longitudinally so as to have a longer or shorter leverage by merely shifting the said securing bolts 14 longitudinally of the slots through which they pass. As the forward or lower end of the casting or mount is provided with external ribs or shoulders which fit closely to the back of the plow standard, shifting of the mount relative to the handle will be prevented and a support for the standard will be furnished so that the thrust of the standard will be taken up by the body of the mount and the bolts, by which the mount is secured to the standard, will be relieved of such strain. As the mount thickens toward its rear or upper end, that is to say, its side faces diverge rearwardly, the handles will be held in their proper diverging relation, while, at the same time, they may be firmly clamped against the sides of the mount and held closely thereto without any liability of splitting or otherwise injuring the same.

The device may be used upon any style of plow and the cost of its manufacture will be very slight.

What I claim is:—

1. A handle mount for plows comprising a body adapted to fit between the ends of the plow handles and provided with a plurality of slots disposed in angular relation with the greater dimension of each slot extending in the general direction of the greater dimension of the body, and securing bolts carried by the handles and passing through some of the slots.

2. A handle mount for plows comprising a body having a substantially longitudinal slot intermediate its ends and provided near its upper end with a plurality of slots converging toward the first-mentioned slot, and securing bolts carried by the plow handles and passing through some of the slots.

3. A handle mount for plows comprising a body having an end adapted to be secured to a plow standard and having an arm projecting upwardly and rearwardly therefrom, the said arm being provided with a substantially longitudinal slot adjacent the point of attachment to the standard and with another substantially longitudinal slot near its upper end, said upper slot being pitched at an angle to the first-mentioned slot.

4. A handle mount for plows comprising a body having external curved shoulders on its opposite sides adapted to fit against a plow standard, the sides of the body diverging rearwardly from the said shoulders, wear plates fitting against the sides of the body in rear of said shoulders and adapted to engage plow handles, and means for securing the plow handles and said wear plates to the said body.

5. A handle mount for plows comprising a body having a solid lower portion adapted to be secured to a plow standard and provided on its sides with curved shoulders to engage the back of the said standard, the upper portion of the body being hollow and having its sides diverging from the said curved shoulders and having a substantially longitudinal slot formed in its side walls at the lower end of said hollow portion, and a plurality of similar slots near the upper end of said hollow portion.

In testimony whereof I affix my signature in presence of two witnesses.

HENRY A. DEAN. [L. S.]

Witnesses:
ERNEST STEELE,
WALTER S. COTHRAN.

---

Copies of this patent may be obtained for five cents each, by addressing the "Commissioner of Patents, Washington, D. C."